Dec. 10, 1963 A. FROHLICH ETAL 3,113,344
INNER BEAD FORMING AND SEALING RING FOR VULCANIZING PRESSES
Filed Feb. 13, 1956 2 Sheets-Sheet 1

INVENTORS
ADOLF FROHLICH &
EDWARD J. HARRIS
BY
J. William Freeman
ATTORNEY

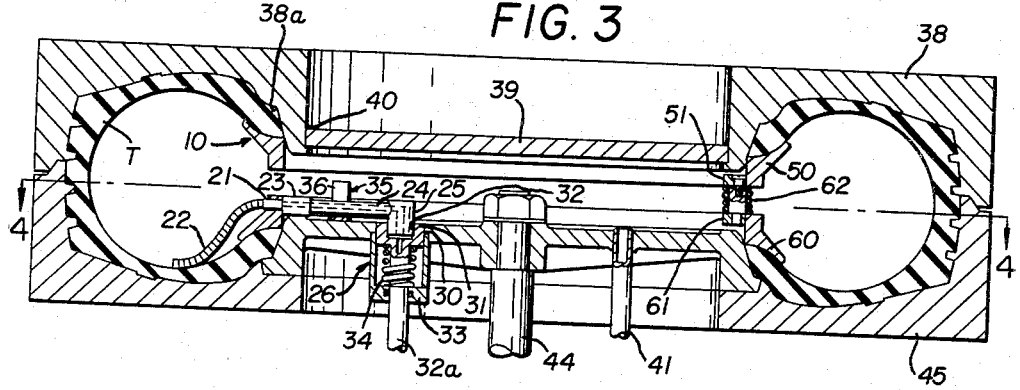
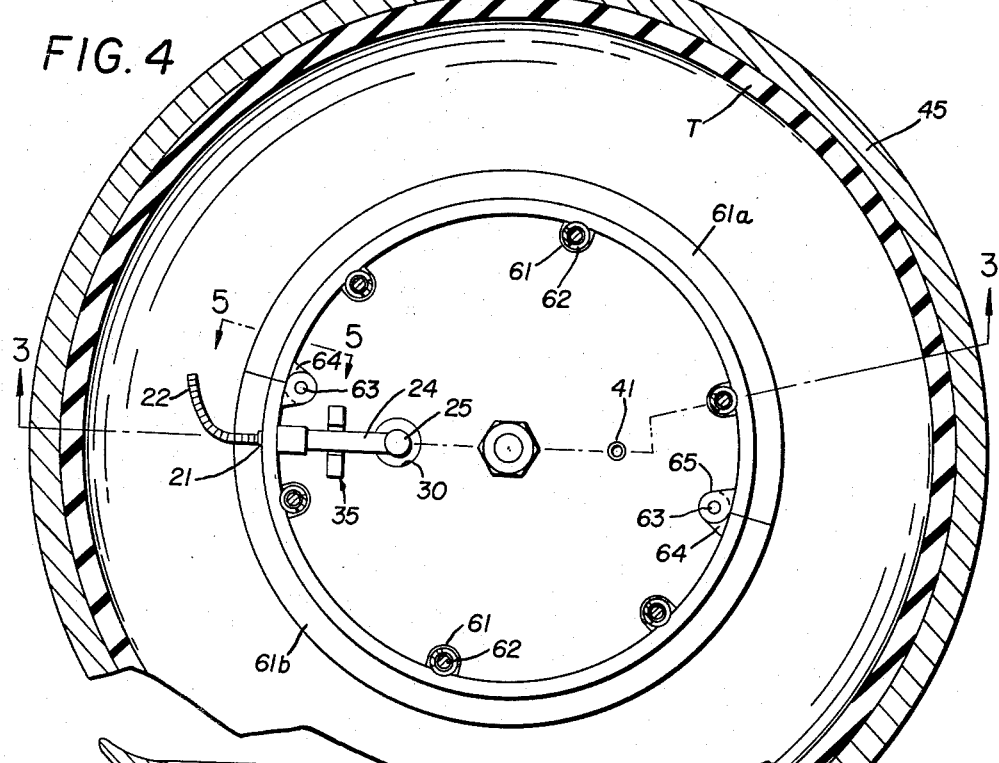
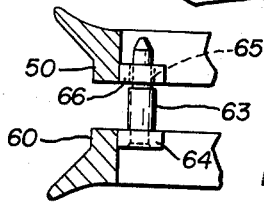

United States Patent Office 3,113,344
Patented Dec. 10, 1963

3,113,344
INNER BEAD FORMING AND SEALING RING FOR VULCANIZING PRESSES
Adolf Frohlich and Edward J. Harris, Akron, Ohio, assignors to the Cleveland Trust Company, Cleveland, Ohio, as trustee
Filed Feb. 13, 1956, Ser. No. 564,956
11 Claims. (Cl. 18—17)

This invention relates to the art of pneumatic tire vulcanization, and in particular has reference to a new and improved type of inner bead ring forming and sealing device capable of utilization in pneumatic vulcanizing presses of known construction.

In the past, the manufacture of pneumatic tires has been effectuated by first forming a plurality of fabric plies in flat form so as to build up a plurality of such layers in what is conventionally referred to as a "flat-built" form. This "flat-built" uncured tire is then positioned in a vulcanizing press where the same is shaped to toroidal form by the use of a pneumatic former of known type.

While the above type of structure has been generally accepted, it is believed disadvantageous in that it requires the use of a relatively complex mechanism to effectuate the timed entrance and withdrawal of the pneumatic former. Additionally, such formers per se, being of rubber, have been found to have relatively short usable duration, and accordingly must be frequently replaced to thus add to the overall cost of vulcanizing pneumatic tires.

It has been proposed in the past to vulcanize pneumatic tires without the use of a pneumatic former. However, such efforts have invariably been unsuccessful, in view of the fact that it was heretofore impossible to provide an efficient type of bead ring mechanism that would serve the dual purpose of creating an air-tight seal at the bead area of the tire being cured, while simultaneously being easy to install and remove prior to and after the vulcanization cycle.

In addition to the aforementioned disadvantages, it has been found that a fixed dimension sealing ring of the type normally employed in the prior art is disadvantageous in that the same is incapable of automatically compensating for the different tire thicknesses of the bead portions, with the result that in certain cases of undersize stock material, for example, the sealing ring will fit loosely between the beads, with the result that an insufficient seal will be provided at this point. Accordingly, the attendant difficulty of providing an efficient seal between the inner beads has long been a drawback in the use of bead sealing rings of the type now known in the prior art.

It has been discovered that if a bead sealing ring is defined by a pair of spaced circular plates that respectively engage the opposed bead portions, and further that if these beads are urged apart under pressure, that an improved seal will be provided at the internal bead area of the tire, with the result that this improved type of split sealing ring can be utilized to effectuate vulcanization of the pneumatic tire without the use of the conventional pneumatic former.

It accordingly becomes a principal object of this invention to provide an improved type of bead sealing ring that has a variable axial dimension, so that predetermined amounts of pressure can be applied against the internally opposed bead walls of a pneumatic tire being vulcanized.

It is a further object of this invention to provide an improved type of bead sealing ring that is simple in operation and efficient in use, with the result that the same may be produced at a relatively low cost.

These and other objects of the invention will become more apparent upon a reading of the following brief specification, considered and interpreted in the light of the accompanying drawings.

Of the drawings:
FIGURE 1 is a sectional view taken through a vulcanizing press provided with the improved sealing ring, and showing the same in the closed or operating position.

FIGURE 3 is a section similar to FIGURE 1, but showing a modified form of the invention.

FIGURE 4 is a view taken on the lines 4—4 of FIGURE 3.

FIGURE 5 is a view taken on the lines 5—5 of FIGURE 4.

Figure 1:
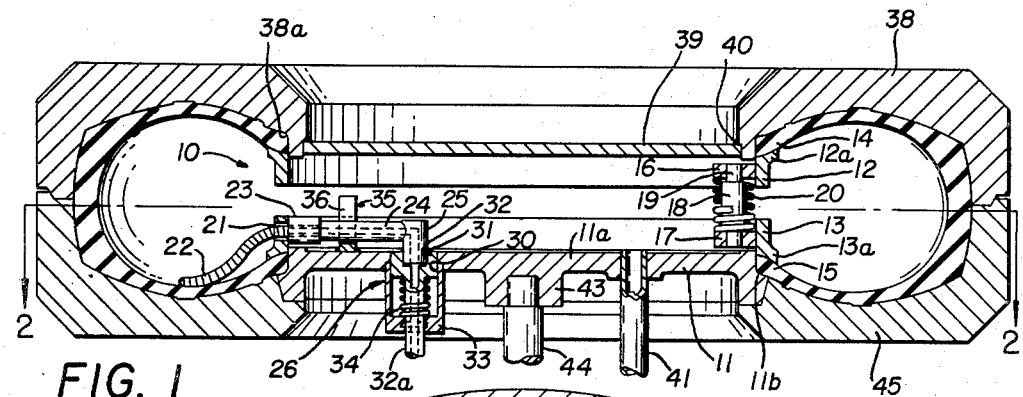
Figure 2:
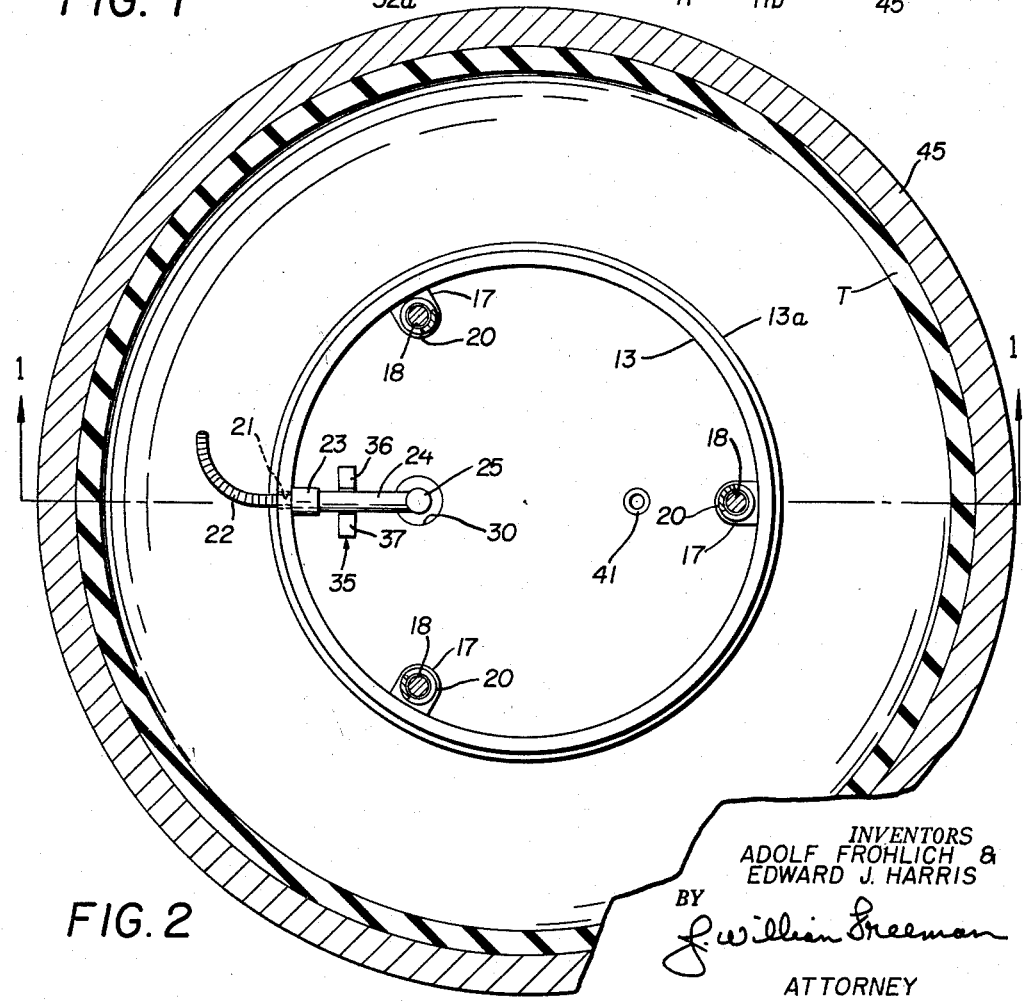
FIGURE 2 is a sectional view taken on the lines 2—2 of FIGURE 1.

Referring now to the drawings and in particular to FIGURES 1 and 2 thereof, the improved sealing ring, generally designated by the numeral 10, is shown concentrically aligned with respect to a plate 11 so as to have the individual sealing rings 12 and 13 thereof engageable against the internal bead walls 14 and 15, respectively, of a pneumatic tire T. For the sake of clarity in description, the ring 12 will hereinafter be referred to as the upper ring, while the sealing ring 13 will be referred to as the lower ring; it being understood that the designations refer specifically to FIGURE 1 of the drawings and are not intended to limit the scope of the disclosure.

As is best shown in FIGURE 1, the upper and lower rings 12 and 13, respectively, are each provided with flange portions 12a and 13a that have their outer peripheral portions engaged against the internal bead sections 14 and 15, respectively. In order that the rings 12 and 13 might be urged apart under tension as shown in FIGURE 1, the upper ring 12 further includes a plurality of radially inwardly projecting lug members 16, 16, with three such lug members being shown in the drawings. By like token, the lower ring 13 includes lug members 17, 17 that are axially aligned with the lug members 16, 16; the arrangement being such that each lug member 17 supports a sleeve 18 within which may be telescopically received a pin 19 that is in turn carried by the lug member 16. As shown in the drawings, a spring 20 operates to urge the members 16 and 17 apart with a telescoping action being present between the members 18 and 19, respectively. As previously indicated, three such lug and spring arrangements are provided as shown in FIGURE 2 of the drawings.

In addition to the aforementioned component parts the lower ring 13 additionally includes an aperture 21 through which is received a flexible hose 22 that is utilized for effectuating any draining condensate that may occur in the tire cavity during vulcanization. This flexible hose 22 is shown connected to a coupling 23 that also receives an exhaust pipe 24 and has a right angle elbow 25 therein provided for connection with exhaust means that are provided in the plate member 11, and which are generally designated by the numeral 26.

Turning now to the construction of the exhaust means 26, together with the means utilized to align the exhaust pipe 24 thereon, it will be noted that the plate 11 is apertured as at 30 so as to receive a slidable piston 31 that has a circular seat 32 provided in the piston head portion thereof. Additionally, a cup member 33 is shown welded to the underside of the plate 11 to form a cylindrical housing for the shiftable piston 31, with coil spring 34 operating to urge the piston member upwardly and out of displacement from the condition illustrated in FIGURE 1 of the drawings.

For the purpose of effectuating alignment of the exhaust pipe 24 with the exhaust means 26, the upper surface 11a of plate 11 is shown as further including a V-shaped vertical projection (FIGURE 1) that is defined by an upstanding lug member 35 that has divergent arms 36 and 37 between which the exhaust pipe 24 may be received, as is clearly shown in FIGURE 2 of the drawings. For the purpose of supplying a closed internal chamber the upper mold section 38 further includes solid plate 39 that is welded thereto as at 40, so as to coact with the lower plate 11.

With reference now to the additional detail of the plate 11, it will be noted that the same further includes a supply pipe 41 through which vulcanizing or other fluid medium may be introduced to the chamber that is defined by the tire T, rings 12 and 13, and the plates 11 and 39. It is also to be noted that the plate 11 further includes a central boss portion 43 that receives a piston rod 44 that is actuated by hydraulic or other means (not shown) so as to permit the receiving of the plate 11 with respect to lower mold section 45, to thus permit stripping or ejecting of the finished tire, with respect to the mold section 45.

In use or operation of the improved sealing ring 10, it will first be assumed that the same is being used to effectuate vulcanization of a standard conventional flat-built tire that is of generally cylindrical configuration; and it will be further assumed that the sealing ring 10 is utilized in connection with any type of vulcanizing press wherein the mold sections 38 and 45 move relatively of each other so as to open and close.

It will now be further assumed that the tire T has had the lower bead portion 15 thereof received on the peripheral bead seat 11b of plate 11, with such mounting of the tire T with respect to the plate 11 being effectuated when the plate 11 was in an extended position.

At this time the plate 11 may be axially moved to the position of FIGURE 1, and upon retraction of the plate 11 to the position of FIGURE 1 the bead sealing ring assembly 10 may be slipped down through the open end of the cylindrical tire T and positioned in place as shown in FIGURE 1, with the lower flange 13a thereof being engaged against the internal surface of the bead 15. The upper ring 12 will at this time be free of contact with the internal surface of the bead ring 14 in view of the unformed nature of the same. During such positioning the exhaust conduit 24 may be located between the arms 36 and 37 so that the elbow 25 is aligned over the circular seat 32.

With the tire T and bead ring assembly 10 positioned as just described, closure of the mold sections may be commenced. During this closure movement it is believed apparent that as the upper mold section 38 moves downwardly the annular bead seat 38a thereof will strike the upstanding bead portion 14, and upon further closing movement of the upper mold section 38 the tire T will have the crown portion thereof radially expanded until such time as the same approaches the toroidal configuration of FIGURE 1. As the configuration of FIGURE 1 is approached, it is apparent that the internal surface of the bead 14 will strike the uppermost surface of the flange 12a, and as continued closing movement continues, the flange 12 will be moved downwardly of FIGURE 1 against the force afforded by the springs 20, 20, and this tensioning movement of the ring member 12 will continue until the mold sections reach the fully closed position of FIGURE 1.

When the condition of FIGURE 1 has been reached, it is apparent that the rings 12 and 13 will be under tension that operates to urge the same apart from each other, with the result that the bead portions 14 and 15 will be respectively gripped between the ring 12 and bead seat 38 on the one hand and between the ring 13 and the bead seat 11b on the other hand.

It is also to be noted that prior to this just described closing movement, the ring assembly 10 has had the exhaust conduit 24 thereof positioned between the arms 36 and 37 of the lug member 35, with the elbow 25 thus aligned within the opening 32. Thus, during the closing movement above described, the piston 31 will be moved downwardly against the force of the spring 34 until the position of FIGURE 1 is reached, at which time a sealed connection will have been made.

At this time vulcanizing medium may be introduced through the conduit 41 and the introduction of such vulcanizing medium as just described will cause a curing action to take place on the internal wall of the tire T. This of course may be supplemented by the use of steam-jacketed molds which would cause a similar vulcanizing pressure to be presented externally of the tire T. During the time that this vulcanizing operation is taking place, it is apparent that the bead portions 14 and 15 will at all times be tightly gripped as a result of the separating pressure exerted by the rings 12 and 13 acting thereagainst. It is also believed apparent that by use of an exhaust line attached to piston rod 32a that any condensate occurring internally of the tire T during vulcanization may be drawn into the hose 22 for exhaust through conduit 24, elbow 25 and piston sleeve 32.

After the tire T has been vulcanized for a predetermined period, the mold sections may be opened and the opening action thereof will cause the upper mold section 38 to be stripped from the tire T as a result of the bead portion 15 of the tire T being held down by the ring 13. When the upper mold section 38 has been opened to the required amount, the hydraulic means (not shown) may be effectuated to cause the piston rod 44 to move upwardly and thus strip the tire T with respect to the lower mold section 45.

At this time, the tire T may be manually or otherwise removed from the extended plate 11 in known manner, followed by subsequent removal of the bead ring assembly 10 from its position between the cured beads 14 and 15, with removal of ring 10 being effectuated by the use of separating pressure on the beads 14 and 15.

The modified form of the invention shown in FIGURES 3, 4 and 5 of the drawings is similar in many respects to that shown and described above in connection with FIGURES 1 and 2 of the drawings; and accordingly, where indicated, like numerals indicate like parts.

It is to be first noted with respect to FIGURES 3, 4 and 5 that the modified form of the invention described herein is designed for use on tires having a greater number of fabric plies, such as is the case in truck tires, for example. Accordingly, the individual upper and lower rings 50 and 60 of FIGURES 3, 4 and 5 are shown provided with a greater number (six) of lug members 51, 51 and 61, 61, respectively, between which springs 62, 62 may act.

In addition to the aforementioned increase in tension between the sealing rings 50 and 60, the device of FIGURES 3, 4 and 5 is further modified in that the individual rings 50 and 60 thereof are each defined by segmented sections 50a, 50b and 60a and 60b (see FIGURE 4). In this regard, the individual segments 50a and 60a are retained together as a unit because of the aforementioned pin connection between lug members 51, 51 and 61, 61. Similarly, the segments 50b and 60b move together as a unit; and these semi-circular segments are releasably joined togeher by the use of a locator pin arrangement that may be of the type set forth in FIGURE 5. In this form, a locator pin 63 projects axially from radial lug 64 so as to receive thereabout the aperture 65 of a radial lug 66; the arrangement being such that the one lug 64 is carried by each segments 60a, 60b, while lug 66 is carried by each segment 50a, 50b. In this manner the sections 50, 60 may be joined together as a unit to define a circular ring.

The use or operation of this modified form of the invention is similar to that previously described and accordingly will not be repeated in detail, except to note that the rings 51a, 51b will first be assembled to form complete ring 50, while the lower rings 61a, 61b will be similarly assembled in the ring form 60.

At this point the apertures 65, 65 of lugs 66, 66 will be located over pins 63, 63 to effectuate complete assembly of the sealing ring, with such juncture of ring members 50, 60 occurring preferably interiorly of the tire T after the same has been positioned on plate 11.

It will be seen from the foregoing that there has been provided a new and novel type of sealing ring for effectuating vulcanizing of a pneumatic tire and characterized by the fact that this sealing ring operates during vulcanization to exert a sealing pressure against the internal face of the spaced bead walls. In this manner a closed annular interior chamber is formed and the bead portions are firmly gripped under the influence of tension pressure. It is believed apparent that other means could be employed to urge the bead engaging surfaces axially apart; and it is noted in this regard that the members 12 and 13 for example, lend themselves to being mounted telescopically of each other, whereby hydraulic pressure could be employed to effectuate relative movement therebetween.

While in accordance of the patent statutes a full and complete disclosure of the invention has been made, it is to be understood that this disclosure is not intended to limit the scope of this invention which has the measure of protection afforded thereby defined by the following claims.

What is claimed is:

1. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat and having axially spaced bead engaging surfaces disposed in concentric spaced relationship with each other and with said bead seats; and means carried by said bead ring means for moving said bead engaging surfaces relatively of each other in an axial direction whereby the spacing between said bead seats and said bead-engaging surfaces may be varied.

2. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat and having axially spaced bead engaging surfaces disposed in concentric spaced relationship with each other and with said bead seats; and pressure means carried by said bead ring means for moving said bead engaging surfaces apart under pressure, whereby said bead-engaging surfaces are urged toward said bead seats.

3. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat and having axially spaced bead engaging surfaces disposed in concentric spaced relationship with each other and with said bead seats; and pressure means carried by said bead ring means for moving said bead engaging surfaces apart under pressure, whereby said bead-engaging surfaces are urged toward said bead seats; said pressure means including at least one spring member interposed axially between said bead engaging surfaces, whereby the same are urged apart.

4. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat and having axially spaced bead engaging surfaces disposed in concentric spaced relationship with each other and with said bead seats; and pressure means carried by said bead ring means for moving said bead engaging surfaces apart under pressure, whereby said bead-engaging surfaces are urged toward said bead seats; said pressure means including hydraulic pressure means exerting axial separating pressure on said bead engaging surfaces.

5. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat including a pair of bead rings each having a bead engaging surface; means for arranging said bead engaging surfaces about a concentric axis with respect to each other and said bead seats; and means carried by said bead ring means for shifting said bead rings axially of each other about said concentric axis.

6. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat including a pair of bead rings each having a bead engaging surface; means for arranging said bead engaging surfaces about a concentric axis with respect to each other and said bead seats; and means carried by said bead ring means for axially separating said bead rings along said concentric axis under tension whereby the same are moved toward said bead seats; said last-mentioned means for separating said ring members, including at least one spring member interposed under tension between said ring members.

7. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat including a pair of bead rings each having a bead engaging surface; means for arranging said bead engaging surfaces about a concentric axis with respect to each other and said bead seats; and means carried by said bead ring means for axially separating said bead rings along said concentric axis under tension whereby the same are moved toward said bead seats; said last-mentioned means for separating said ring members including hydraulic pressure means exerting axial separating pressure on said rings.

8. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat including a pair of bead rings each having a bead engaging surface; means for arranging said bead engaging surfaces about a concentric axis with respect to each other and said bead seats; means carried by said bead ring means for shifting said bead rings axially of each other about said concentric axis; and a pair of plate members respectively sealing off the central openings of said relatively movable mold sections.

9. A vulcanizing press of the character described, comprising; a pair of relatively movable, complemental mold sections; means for opening and closing said mold sections; a first bead seat defined by one said mold section; a second bead seat carried by said remaining mold section in shiftable relationship therewith; bead ring means releasably associated with said shiftable bead seat carried about its axis by one said mold section and having axially spaced bead engaging surfaces disposed concentrically to each other and said bead seats; and means carried by said bead ring means for moving said bead engaging surfaces relatively of each other and said bead seats in an axial direction; said bead ring means being circular in plan and being defined by at least two arcuate segments connected together at their arcuate ends.

10. The device of claim 9 further characterized by the fact that said arcuate segments are releasably interconnected at their arcuate ends.

11. A vulcanizing press of the character described, comprising; a pair of relatively movable, complemental mold sections, each having an axis of rotation and a bead seat; means for opening and closing said mold sections, with said respective axis of rotation thereof being concentric upon closure; a first bead seat defined by one said mold section; a second bead seat carried by said remaining mold section in shiftable relationship therewith; bead ring means releasably associated with said shiftable bead seat and having axially spaced bead engaging surfaces that are spaced from said bead seats; means for moving said bead engaging surfaces relatively of each other in an axial direction; and means for locating said axis of said bead ring concentric with said axis of said mold sections whereby said bead-engaging surfaces are concentric with each other and said bead seats.

References Cited in the file of this patent
UNITED STATES PATENTS

| | | |
|---|---|---|
| 1,366,290 | Smith et al. | Jan. 18, 1921 |
| 1,757,376 | Laursen | May 6, 1930 |
| 1,890,133 | Shoemaker | Dec. 6, 1932 |
| 1,895,603 | Brundage | Jan. 31, 1933 |
| 2,469,629 | Boyer | May 10, 1949 |
| 2,670,499 | Weigold et al. | Mar. 2, 1954 |